Oct. 7, 1941.　　　　J. O. ALMEN　　　　2,258,127
ENGINE MECHANISM
Filed Jan. 30, 1940
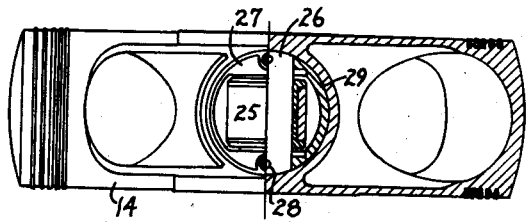
Fig-3-
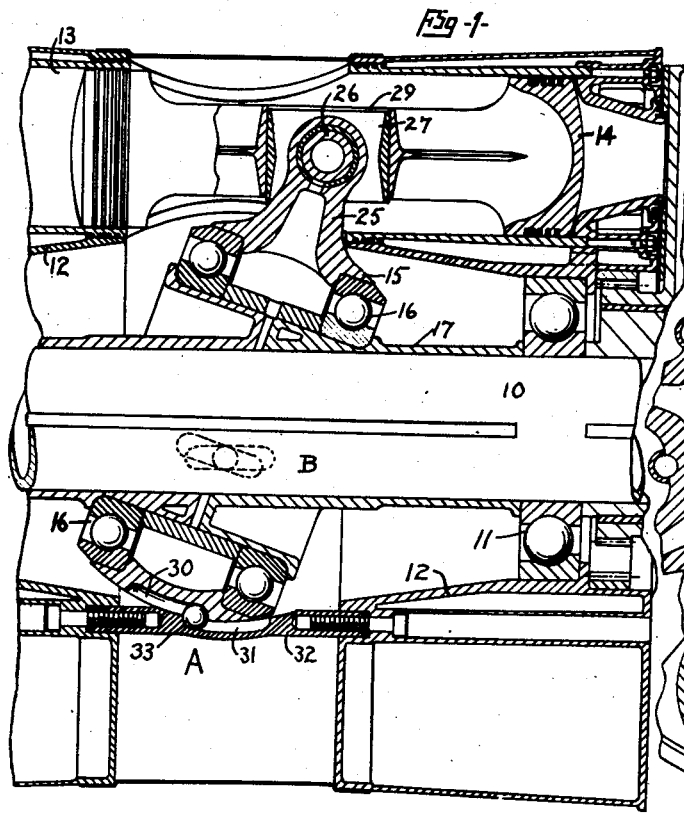
Fig-1-
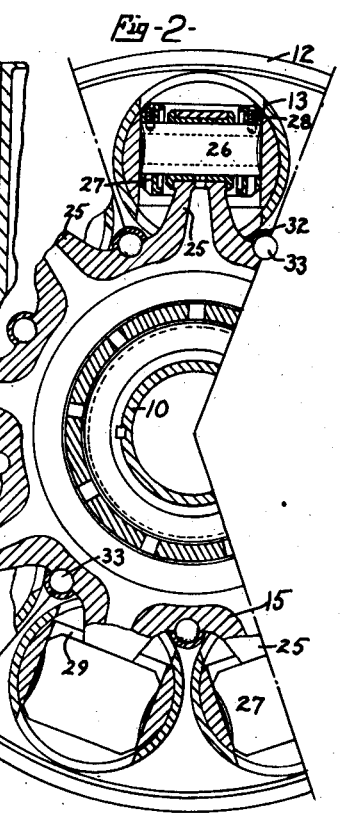
Fig-2-
INVENTOR
JOHN O. ALMEN
BY *Edwin S. Hall*
ATTORNEY Patented Oct. 7, 1941

2,258,127

UNITED STATES PATENT OFFICE 2,258,127

ENGINE MECHANISM

John O. Almen, Royal Oak, Mich.

Application January 30, 1940, Serial No. 316,401

6 Claims. (Cl. 74—60)

This invention relates to engine mechanism and more especially to mechanism for the interconversion of piston reciprocation and shaft rotation in engines and pumps of the barrel type, that type having cylinders parallel to the shaft.

In discussing parallel cylinder engines, it is convenient to distinguish between a swashplate (which rotates relative to the cylinders, being ordinarily fixed upon the shaft), and a wabbler (which does not rotate relative to the cylinders, being mounted on bearings on and inclined to the shaft). An object of this invention is to provide improved means for preventing rotation of a wabbler.

The correct wabbler movement and suitable restraints by which it may be insured were described in earlier Almen patents especially Nos. 1,233,635 (Re. 15,442) and 1,411,556. In these patents it was shown that when the wabbler is properly controlled to prevent rotation, similar points in the wabbler plane (for example, the centers of the several wabbler arms), follow identical loci having the form of a spherical lemniscate (figure 8 on the surface of a sphere). In end view, this lemniscate is a small circle of diameter equal to R vers $\phi$ where R is the radius of the point in the wabbler plane and $\phi$ is the angle of inclination of that plane from the plane normal to the engine shaft, the point revolving about this small circle at a rate twice that of shaft rotation and in the same direction. The restraints described in the patents mentioned made use of this circular end view of the lemniscate to insure correct motion of the wabbler.

Another problem in the wabbler mechanism is to prevent or control rotation of the piston members if the mechanism is such that free rotation thereof cannot be permitted. In the latter patent above-mentioned, the circular restraints used to control wabbler rotation were also used to control piston rotation, by offsetting the two rolling control elements in each piston, one to one side of the piston axis and the other to the other side. An object of this invention is to combine an improved control for the wabbler with a mechanism which positively controls piston rotation.

Other Almen patents have described other types of wabbler restraint each capable of maintaining correct wabbler motion, including various systems of gearing and series of cam surfaces.

A Hooke type universal joint has been used in wabbler engines to hold the wabbler against rotation, but has proved objectionable; this type of universal joint does not transmit uniform angular velocity, and consequently does not maintain correct wabbler motion, but introduces angular oscillations of the wabbler which result in troublesome vibration having a period twice shaft speed.

An object of this invention is to provide a wabbler control comprising a uniform velocity universal joint connecting the wabbler and the frame or cylinder members, preventing the wabbler from rotating relative to the cylinders and insuring correct wabbler movement. A further object is to combine this correct restraint with the type of wabbler mechanism which imposes substantially no engine torque reaction on the wabbler, thus reducing the load on the restraint to substantially that required to resist the frictional drag of the wabbler bearings.

Briefly described, the invention consists of the use of any universal joint construction capable of transmitting uniform angular velocity to prevent rotation of the wabbler relative to the cylinders. The invention consists further of the combination of a uniform velocity universal joint wabbler control with the type of wabbler-piston connection which includes a wristpin with its axis tangent to a circle in the wabbler plane.

These and other objects of the invention will be clear from the following description in connection with the drawing in which Fig. 1 is a longitudinal section of an engine or pump mechanism;

Fig. 2 is a transverse section on the mid-plane of the mechanism and on the mid-plane of the wabbler; and Fig. 3 is a radial view, partly in section, of the piston member of Fig. 1 and associated parts.

Referring to the drawing, shaft 10 is mounted on bearings 11 in cylinder blocks 12. Cylinders 13 are parallel to shaft 10 and connect cylinder blocks 12. Piston members 14 are reciprocable in cylinders 13. Wabbler 15 is mounted on bearings 16 whose inner races are fixed on boss members 17 with bearings 16 inclined to shaft 10. Boss members 17 are fixed on shaft 10.

Wabbler 15 has arms 25, one for each piston member 14. Each arm 25 is rotatable and slidable upon wristpin 26 which is fixed in radial crosshead 27 by setscrews 28. Radial 27 is rotatable and slidable in a bore 29 in piston member 14.

In each space between two adjacent arms 25 on wabbler 15, a longitudinal ball race 30 is formed. A corresponding ball race 31 is formed in a member 32 fixed to cylinder blocks 12. Ball 33 is operable in each pair of races 30 and 31

In operation, rotation of shaft 10 is accompanied by reciprocation of piston members 14, and the oscillatory combined rotation and axial sliding of radial 27 within the bore 29 in piston member 14 and of wabbler arm 25 on wristpin 26. Displacement of the center of arm 25 from the plane of the cylinder axis, as that center follows its lemniscate path, causes a slight oscillatory rotation of piston member 14 during its reciprocation, tending to improve lubrication of the piston member 14 in cylinder 13 and tending also to prevent piston ring sticking. This slight rotation of the piston member 14 is predetermined by the mechanism, and no uncontrolled rotation of the piston member is possible.

Rotation of shaft 10 is also accompanied by the rolling of balls 33 in their races 30 and 31. Balls 33 are maintained with their centers always in the plane which bisects the angle between the mid-plane of the wabbler and the plane normal to the shaft thru the center of the wabbler by the interaction of races 30 and 31. At the position shown at A in Fig. 1, the two races are coplanar, but the ball is positively located by the ends of races 30 and 31 as shown. At all other positions, the ball 33 is positively located at the intersection of the two races 30 and 31, as indicated diagrammatically at B in Fig. 1.

Most of the proposed wabbler mechanisms have the objectionable characteristic of imposing the engine torque reaction upon the wabbler. For example, when the wabbler is connected to the pistons by ball-jointed connecting rods, it is readily seen that the wabbler must be held against rotation in order to turn the shaft at all. (If not so held, the thrust of the rods would merely turn the wabbler on its bearings and tangle up the rods.) In other words, the torque reaction is on the wabbler, and the wabbler restraint must be adequate for carrying this heavy load. It has not been easy to find a restraint both capable of carrying the engine torque reaction and capable of maintaining correct wabbler motion. The uniform velocity universal joint of the present invention might be developed to carry engine torque reaction satisfactorily, especially if that type of rolling ball universal joint were used in which the balls are in compression rather than in shear, but it is obviously much better to avoid loading the wabbler restraint so heavily. The wabbler mechanism shown, having wristpins 26 with their axes tangent to a circle in the plane of the wabbler, imposes practically no torque reaction on the wabbler. This is apparent from the fact that all working surfaces of the wabbler are surfaces of revolution about the wabbler axis or tangent to such surfaces of revolution, so that essentially, only frictional forces can act to turn the wabbler. Thus the balls 33 and their races 30 and 31 have essentially only a guiding function being loaded with little more than the frictional drag of wabbler bearings 16.

Having thus described the invention, it is obvious that the objects thereof as stated have been attained in a practical manner. While a particular embodiment of the invention has been described with a particular form of uniform velocity universal joint, it is understood that changes may be made in the construction and arrangement of the various parts, or another form of uniform velocity universal joint substituted for that shown, without departing from the spirit and scope of the invention as expressed in the following claims.

I claim:

1. In an engine mechanism, a shaft, cylinders parallel thereto, piston members operable in said cylinders, a wabbler, bearings for said wabbler on and inclined to said shaft, means operably connecting said wabbler with said piston members, and means operably connecting said wabbler with said cylinders and comprising a universal joint capable of transmitting uniform angular velocity and serving to restrain said wabbler from rotation relative to said cylinders.

2. In an engine mechanism, a shaft, cylinders parallel thereto, piston members operable in said cylinders, a wabbler, bearings for said wabbler on and inclined to said shaft, means operably connecting said wabbler with said piston members, and means operably connecting said wabbler with said cylinders and comprising a universal joint for restraining said wabbler from rotation relative to said cylinders, said universal joint including balls and ball races maintaining said balls with their centers in a plane bisecting the angle between the plane of said wabbler and the plane normal to said shaft.

3. In an engine mechanism, a shaft, cylinders parallel thereto, piston members operable in said cylinders, a wabbler, bearings for said wabbler on and inclined to said shaft, means operably connecting said wabbler with said piston members and maintaining said wabbler substantially free from the torque reaction of said engine during operation thereof, and means for restraining said wabbler from rotation relative to said cylinders and comprising a universal joint capable of transmitting uniform angular velocity.

4. In an engine mechanism, a shaft, cylinders parallel thereto, piston members operable in said cylinders, a wabbler, bearings for said wabbler on and inclined to said shaft, means operably connecting said wabbler with said piston members and including wristpins held with their axes tangent to a circle in the plane of said wabbler, and means for restraining said wabbler from rotation relative to said cylinders and comprising a universal joint capable of transmitting uniform angular velocity.

5. In a mechanism of the class described, a shaft, cylinders parallel thereto, piston members operable in said cylinders, a wabbler, bearings for said wabbler on and inclined to said shaft, means for restraining said wabbler from rotation relative to said cylinders and comprising a universal joint of any form capable of transmitting uniform angular velocity, and an operable connection between said wabbler and each of said piston members, said connection comprising an arm on said wabbler, a bore in said wabbler arm with its axis substantially tangent to a circle concentric with and in the mid-plane of said wabbler, a wristpin rotatable and slidable in said wabbler arm bore, a cylindrical wristpin carrier supporting said wristpin, and a bore in said piston member with its axis substantially radial to said shaft and rotatable and slidable upon said wristpin carrier.

6. In a mechanism of the class described, a shaft, cylinders parallel thereto, piston members operable in said cylinders, a wabbler, bearings for said wabbler on and inclined to said shaft, means for restraining said wabbler from rotation relative to said cylinders and comprising a universal joint, said joint including balls and ball races maintaining said balls with their centers in a plane bisecting the angle between the plane of said wabbler and the plane normal to said shaft, and an operable connection between said wabbler and each of said piston members, said connection comprising an arm on said wabbler, a bore in said wabbler arm with its axis substantially tangent to a circle concentric with and in the mid-plane of said wabbler, a wristpin rotatable and slidable in said wabbler arm bore, a wristpin carrier supporting said wristpin, and a bore in said piston member with its axis substantially radial to said shaft and operably receiving said wristpin carrier for rotation and sliding therein.

JOHN O. ALMEN.